(12) United States Patent
Strandberg

(10) Patent No.: US 11,474,524 B2
(45) Date of Patent: Oct. 18, 2022

(54) ROBOTIC MOWER AND METHOD FOR CONTROLLING A ROBOTIC MOWER

(71) Applicant: Globe (Jiangsu) Co., Ltd., Jiangsu (CN)

(72) Inventor: Stefan Strandberg, Joenkoeping (SE)

(73) Assignee: Globe (Jiangsu) Co., Ltd., Jiangsu (CN)

( * ) Notice: Subject to any disclaimer, the term of this patent is extended or adjusted under 35 U.S.C. 154(b) by 351 days.

(21) Appl. No.: 16/499,483

(22) PCT Filed: Mar. 30, 2018

(86) PCT No.: PCT/CN2018/081212
§ 371 (c)(1),
(2) Date: Sep. 30, 2019

(87) PCT Pub. No.: WO2019/183907
PCT Pub. Date: Oct. 3, 2019

(65) Prior Publication Data
US 2020/0401146 A1 Dec. 24, 2020

(51) Int. Cl.
*G05D 1/02* (2020.01)
*A01D 34/00* (2006.01)
*A01D 101/00* (2006.01)

(52) U.S. Cl.
CPC .......... *G05D 1/0214* (2013.01); *A01D 34/008* (2013.01); *G05D 1/0219* (2013.01);
(Continued)

(58) Field of Classification Search
CPC .. G05D 1/0214; G05D 1/0219; G05D 1/0225; G05D 2201/0208; A01D 34/008; A01D 2101/00
See application file for complete search history.

(56) References Cited

U.S. PATENT DOCUMENTS 8,433,468 B2 *  4/2013  Johnson ................. B60L 58/21
                                                           701/519
8,942,862 B2    1/2015  Markusson et al.
(Continued)

FOREIGN PATENT DOCUMENTS

CN    102844722 A    12/2012
CN    105009014 A    10/2015
(Continued)

OTHER PUBLICATIONS

Search Report and Written Opinion in related International Patent Application No. PCT/US2018/081212 dated Jan. 4, 2019; 13 pages.

*Primary Examiner* — Jeff A Burke
*Assistant Examiner* — Sihar A Karwan
(74) *Attorney, Agent, or Firm* — Rooney IP, LLC

(57) ABSTRACT

A robotic mower and method for controlling a robotic mower to a predetermined position, by means of a guide wire. The robotic mower includes a control unit and at least one sensor. At least one of the sensors detects a signal from the guide wire and follows the guide wire at a first distance that is randomly determined. The robotic mower follows the guide wire until detecting, by means of the at least one sensor, a signal from a boundary wire and then following the boundary wire at a second distance, which is randomly determined. When detecting that the signal strength from the guide wire falls outside a first predetermined threshold, the robotic mower starts following the guide wire again.

15 Claims, 4 Drawing Sheets

(52) U.S. Cl.
   CPC ....... *G05D 1/0225* (2013.01); *A01D 2101/00* (2013.01); *G05D 2201/0208* (2013.01)

(56) References Cited

U.S. PATENT DOCUMENTS

| | | |
|---|---|---|
| 9,119,341 B2 | 9/2015 | Jagenstedt |
| 2013/0345922 A1* | 12/2013 | Biber ................... A01D 34/008 701/25 |
| 2019/0248007 A1* | 8/2019 | Duffy ........................ E01H 1/00 |
| 2020/0142425 A1* | 5/2020 | Strandberg ........... G05D 1/0088 |
| 2021/0046205 A1* | 2/2021 | Copeland, Jr ....... G05D 1/0225 |
| 2021/0112708 A1* | 4/2021 | Kameyama .............. G05D 1/02 |

FOREIGN PATENT DOCUMENTS

| | | |
|---|---|---|
| CN | 107493797 A | 12/2017 |
| EP | 2413214 A1 | 2/2012 |

\* cited by examiner

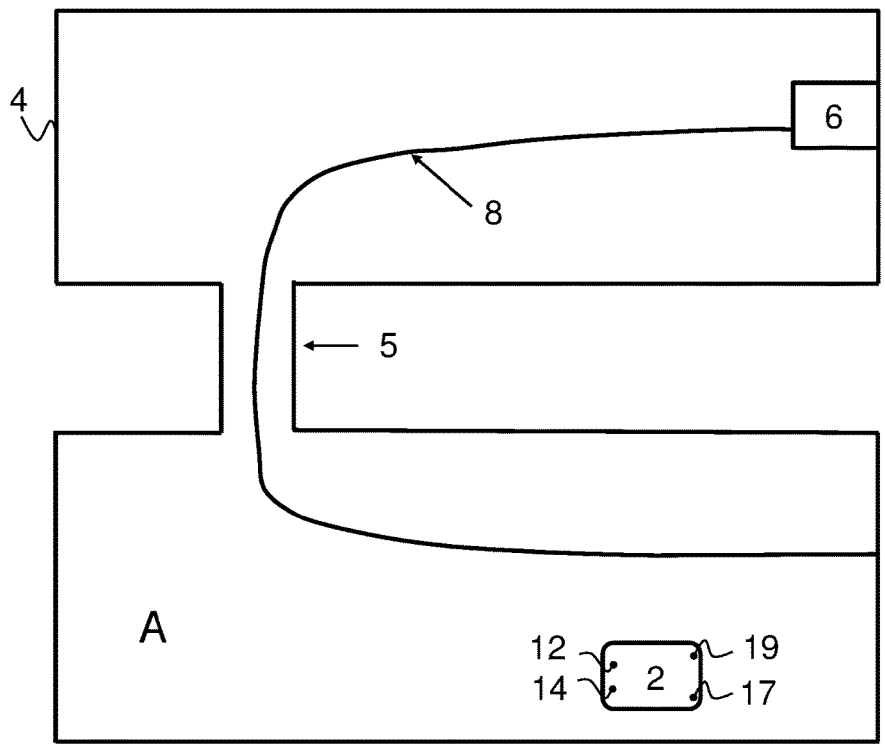
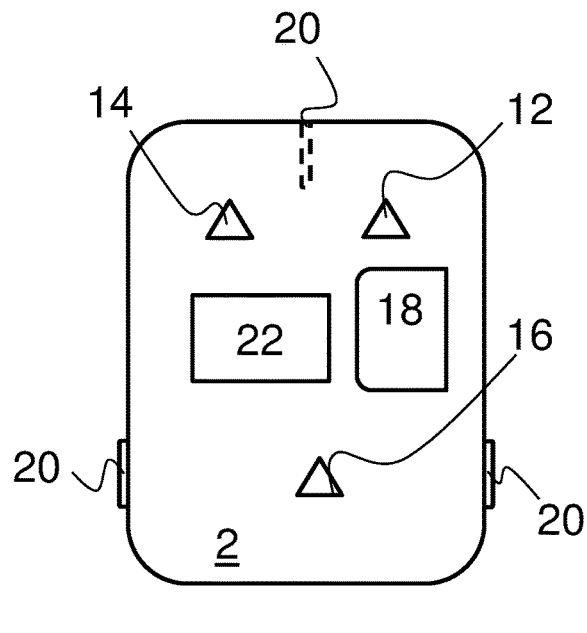
Fig. 2a
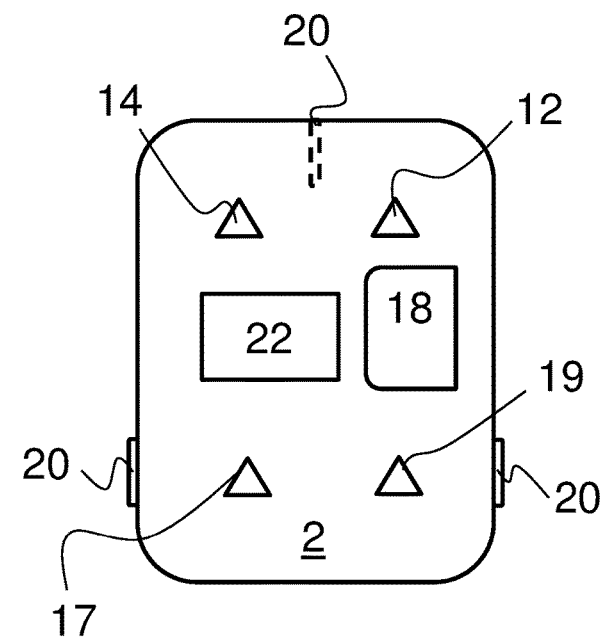
Fig. 2b

ROBOTIC MOWER AND METHOD FOR CONTROLLING A ROBOTIC MOWER

TECHNICAL FIELD

The present invention relates generally to a robotic mower and a method for controlling the path of the robotic mower to and from a charging station, and more specifically for controlling the path of the robotic mower through narrow passages.

BACKGROUND ART

Robotic mowers, also called self-propelled lawnmowers, are generally known. These robotic mowers are provided with a rechargeable battery. When the remaining power in the battery is below a certain level the robotic mower is programmed to return to the charging station to recharge the battery. In prior art, there are many different methods for returning the robotic mower to the charging station. One common method is that the robotic mower, when receiving a command to return to the charging station, continues its movement until a boundary wire is detected and then follows the boundary wire to the charging station that is provided somewhere along the boundary wire. When the robotic mower is close to the charging station a docketing process is started such that the robotic mower is safely guided into contact with a charging connector of the charging station.

Another option when returning to the charging station is to use a guide wire, which the robotic mower follows back to the charging station. The use of a guide wire often enables a shorter and faster way back to the charging station compared to following the boundary wire. The guide wire is also beneficial to use when the robotic mower needs to navigate through a narrow passage.

One problem when following the guide wire or boundary wire is that the robotic mower will make tracks in the lawn. According to prior art there are there are numerus ways to solve this problem. U.S. Pat. No. 8,942,862 discloses a method for guiding a robotic garden tool to a predetermined position, for example to a charging station or to a start position. The robotic garden tool follows the guide wire at a variable distance when it returns back to the charging station. This variable distance may be randomly determined in order to avoid following the same path every time. Thus, any permanent marks and/or tracks on lawns due to wheels may be avoided. Even if this solution may avoid creating permanent marks in most situations, there will be a problem when the robotic mower has to pass a narrow passage, since it then may get "out of bounce", i.e. it will cross the boundary wire at the narrow passage, since the variable distance is to great. This problem is addressed in U.S. Pat. No. 9,119,341 in which the robotic mower follows a first signal source at a first varying distance and then determines a second varying distance when the robotic mower detects a second signal source. The second varying distance is determined based on the detected strength of both the first signal source and the second signal source. Thus, this solution is rather complicated and requires some computational effort.

Thus, there are described numerous different ways in prior art to avoid permanent marks and/or tracks on lawns due to wheels as the robotic mower follows a guide wire or a boundary wires. There, are also some solutions adapted for passing narrow passages. However, there is still room for improvements and simplifications for situations when the robotic mower passes narrow passages.

SUMMARY OF INVENTION

An object of the present invention is to provide a method for controlling a robotic mower to a predetermined position, by means of a guide wire within an area delimited by a boundary wire and especially for controlling the path of the robotic mower through a narrow passage.

According to one aspect the object is accomplished by a robotic mower, comprising a control unit and at least one sensor, performing a method comprising detecting, by means of the at least one sensor, a signal from the guide wire and following the guide wire at a first distance, wherein the first distance corresponds to a given first signal strength that is sensed by the at least one sensor and wherein the control unit randomly selects the first signal strength each time the guide wire signal is detected. The robotic mower follows the guide wire until detecting, by means of the at least one sensor, a signal from the boundary wire, and then instead following the boundary wire at a second distance, wherein the second distance corresponds to a given second signal strength that is sensed by the at least one sensor and wherein the control unit randomly selects the second signal strength each time the boundary wire signal is detected. When detecting that the first signal strength from the guide wire falls outside the first predetermined threshold, the robotic mower starts following the guide wire again.

According to exemplary embodiments the robotic mower continues to move towards the guide wire or the boundary wire, after the signal from the guide wire or the boundary wire has been detected, until a first or second predetermined threshold corresponding to the first or second signal strength is reached, respectively.

According to other exemplary embodiments the robotic mower follows the guide wire or the boundary wire by controlling the robotic mower such that the first or second signal strength that is sensed by the at least one sensor is substantially constant.

In yet another embodiment the control unit randomly selects the first or second predetermined threshold, such that the first or second signal strength that the robotic mower follows differs from time to time in order to avoid creation of tracks on a lawn.

Another object of the present invention is to provide a robotic mower that is controllable to a predetermined position, by means of a guide wire within an area delimited by a boundary wire. The robotic mower comprises a control unit and at least one sensor, wherein the control unit comprises a processor and a memory, the memory comprising instructions which when executed by the processor causes the robotic mower to:

- detect, by means of the at least one sensor, a signal from the guide wire,
- follow the guide wire at a first distance, wherein the first distance corresponds to a given first signal strength that is sensed by the at least one sensor and wherein the control unit randomly selects the first signal strength each time the guide wire signal is detected,
- detect, by means of the at least one sensor, a signal from the boundary wire,
- follow the boundary wire at a second distance, wherein the second distance corresponds to a given second signal strength that is sensed by the at least one sensor and wherein the control unit randomly selects the second signal strength each time the boundary wire signal is detected, detect that the first signal strength from the guide wire falls outside the first predetermined threshold, and follow the guide wire again.

The control unit is further configured such that it causes the robotic mower to perform all the method steps described above.

According to one aspect there is achieved a computer program comprising computer program code, which computer program code is adapted, if executed by the processor of the control unit, to implement the methods described above.

By providing a method and a robotic mower for controlling the robotic mower to a predetermined position, by means of a guide wire within an area delimited by a boundary wire and especially for controlling the path of the robotic mower through a narrow passage it is possibly to achieve avoid permanent tracks on a lawn yet having a simple and robust solution.

BRIEF DESCRIPTION OF DRAWINGS

The invention is now described, by way of example, with reference to the accompanying drawings, in which:

FIG. 1 a schematic view of a robotic mower system.

FIG. 2a is a schematic view of an exemplary embodiment of the robotic mower.

FIG. 2b is a schematic view of another exemplary embodiment of the robotic mower.

DESCRIPTION OF EMBODIMENTS

Figure 3:
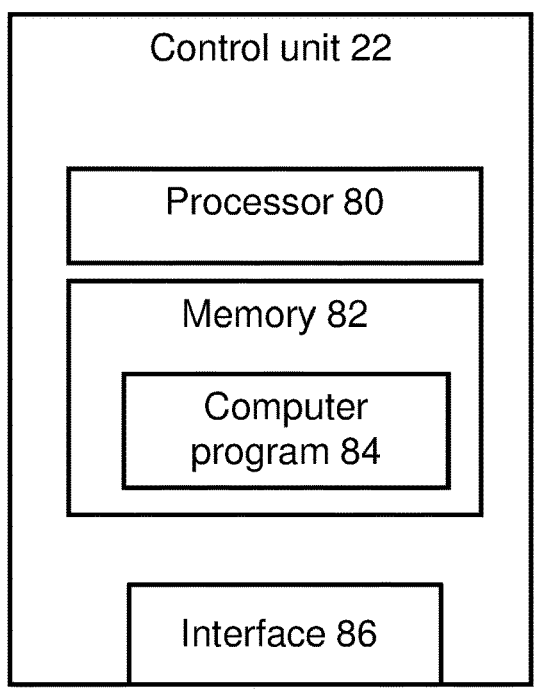
FIG. 3 is a schematic block diagram of a control unit in the robotic mower.
Figure 4:
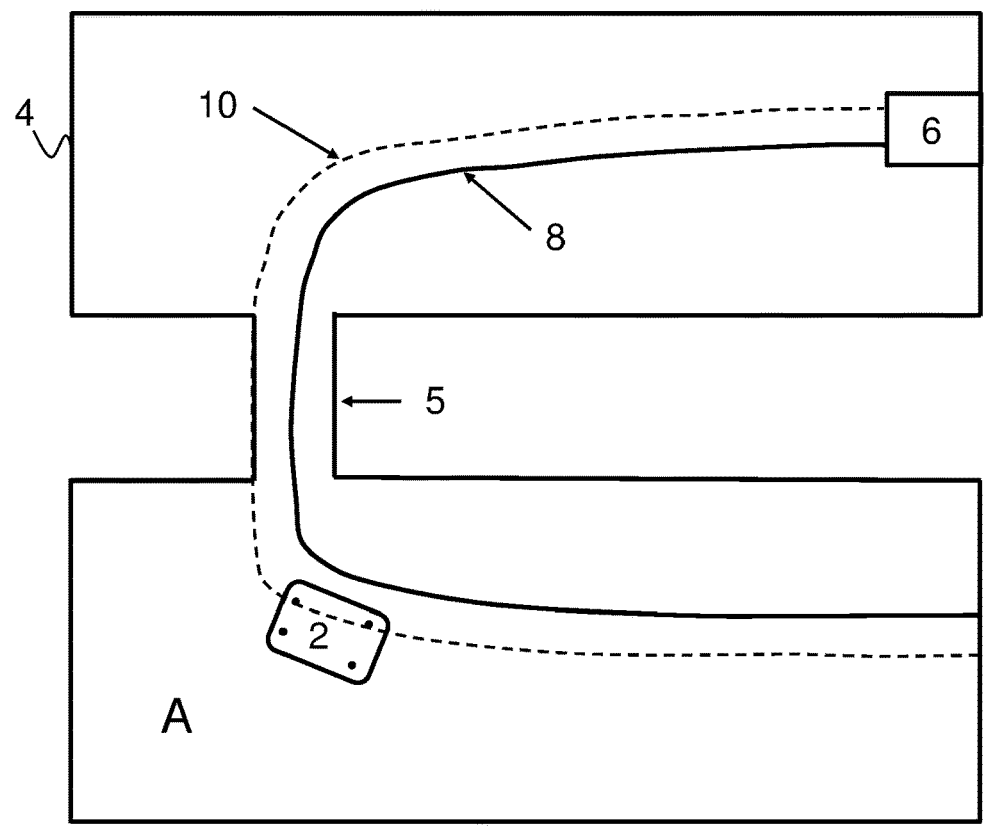
FIG. 4 to FIG. 7 are schematic views showing how the robotic follows a guide wire/boundary wire.
Figure 5:
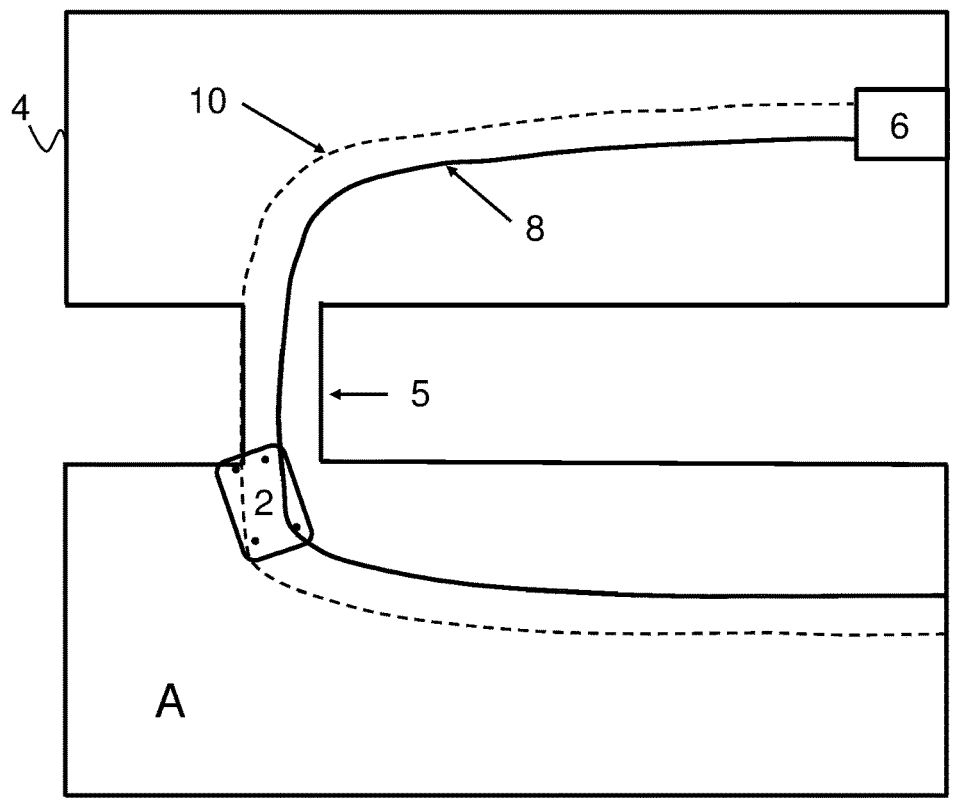
Figure 6:
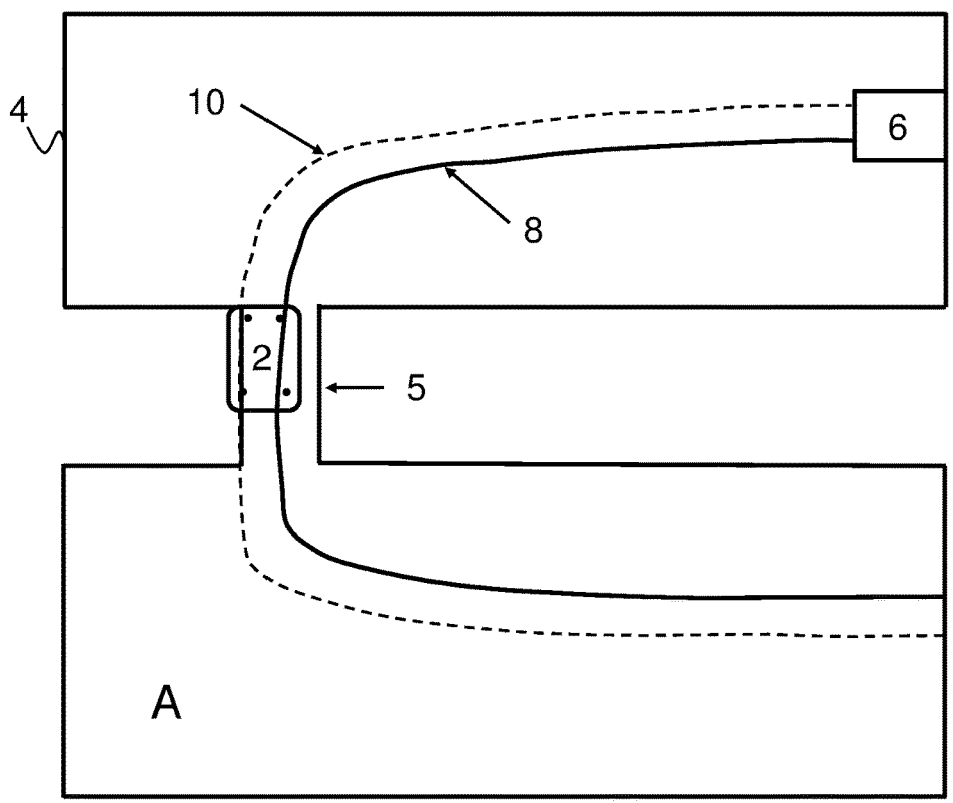
Figure 7:
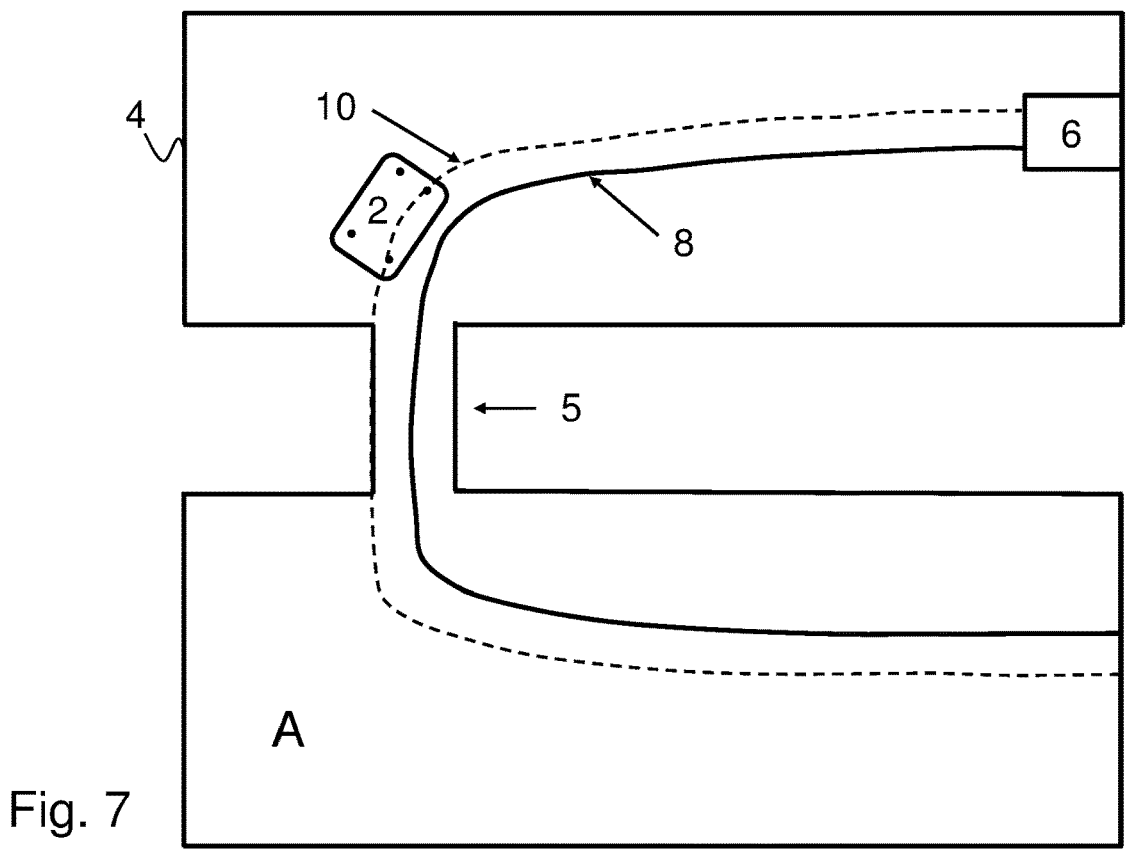

In the following, a detailed description of exemplary embodiments for controlling a robotic mower to a predetermined position, particularly through narrow passages, by means of a guide according to the present invention will be presented.

FIG. 1 shows a schematic overview of a system for performing the method of controlling a robotic mower 2 to a predetermined position. The robotic mower is provided with sensors 12, 14, 17 and 19. The robotic mower 2, or as it also may be called a self-propelling lawnmower, is battery powered and needs to be recharged at regular intervals at a charging station 6. The robotic mower 2 is during operation configured to move across an area A surrounded by a boundary wire 4. As is obvious the robotic mower 2 is depicted somewhat enlarged for the sake of clarity. The boundary wire 4 may be configured in many different ways, such that it delimits the area A within which the robotic mower 2 is allowed to move. In FIG. 1 the boundary wire 4 delimits two larger areas that are tied together with a narrow passage 5. The boundary wire 4 is preferably provided under the ground in the lawn, such that is not visible, but may also be provide on or above the ground. The boundary wire 4 could be an ordinary copper wire of single-core type. There are of course also other options, which are well-known by a person skilled in the art, such as multi stranded wire types. FIG. 1 further shows a guide wire 8 which the robotic mower 2 may follow to the charging station 6 when it is time to re-charge. By using a guide wire 8 it is possible to return the robotic mower 2 to the charging station 6 in a faster and less energy consuming way, which is well known in the art.

The boundary wire 4 and the guide wire 8 are all connected to a signal generator, which in this embodiment is provided in the charging station 6. The signal generator feeds each wire with an Alternating Current, AC, signal, such that the robotic mower 2 may recognize which wire or loop it is detecting when it is within sensing distance, which is also known in the art.

Turning now to FIG. 2a, an exemplary embodiment of the robotic mower 2 will be closer described. The robotic mower 2 comprises a control unit 22, wheels 20, at least one sensor 12, 14 and/or 16 and a battery 18. The control unit 22, which will be closer described in conjunction with FIG. 3, comprises among other things a processor 80 for controlling the movement of the robotic mower 2. When the robotic mower 2 is in operation the sensors 12, 14 and 16 sense the magnetic field that is generated in the boundary wire 4 and the guide wire 8. The sensed magnetic field (signal) is decoded in the control unit 22 to determine from which loop or wire it was received. In a preferred embodiment, the robotic mower 2 is provided with three sensors, two front sensors 12, 14 and one rear sensor 16. In this embodiment one of the two front sensors 12, 14 may be used to detect the presence of the boundary wire 4, which will be further described below.

FIG. 2b shows another embodiment of the robotic mower 2, the difference to the previous embodiment being that it comprises two rear sensors 17, 19 instead of one. The rest of the description of the robotic mower 2 will therefore not be repeated here. With two rear sensors 17, 19 the precision of controlling the robotic mower 2 may be further enhanced. One or both of the rear sensors 17, 19 may for example be used when determining the signal strength of the boundary wire 4 or the guide wire 2 as will be further be described below.

With reference to FIG. 3, the control unit 22 of the robotic mower 2 will be closer described. The control unit 22 comprises, as mentioned above the processor 80 and a memory 82. The memory 82 may comprise a computer program 84 comprising computer program code, i.e. instructions. The computer program code is adapted to implement the method steps performed by the robotic mower 2 when the code is executed on the processor 80. The control unit 22 further comprises an interface 86 for communication with the sensors 12, 14 and 16, and the sensors 12, 14, 17 and 19, respectively, and a motor that operates the robotic mower 2.

The processor 80 may comprise a single Central Processing Unit (CPU), or could comprise two or more processing units. For example, the processor 80 may include general purpose microprocessors, instruction set processors and/or related chips sets and/or special purpose microprocessors such as Application Specific Integrated Circuits (ASICs), Field Programmable Gate Arrays (FPGAs) or Complex Programmable Logic Devices (CPLDs). The processor 80 may also comprise a storage for caching purposes.

Figure 8:
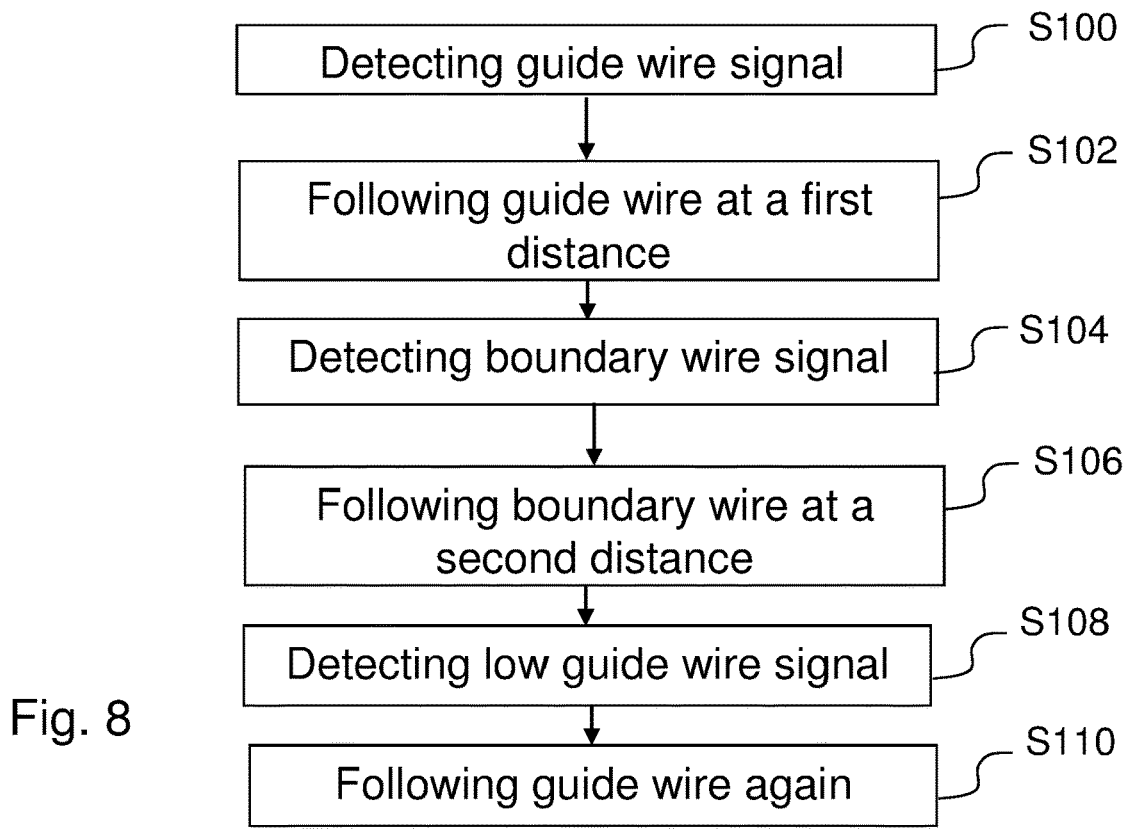
FIG. 8 is a flow chart of a method for controlling the robotic mower to a predetermined position.

Turning now to FIG. 4, FIG. 5, FIG. 6, FIG. 7 and FIG. 8 the method for controlling the path of the robotic mower 2 to and from the charging station 6, and more specifically for controlling the path of the robotic mower through a narrow passage 5 will be closer described. FIGS. 4 to 7 shows various stages for the robotic mower 2 when following the guide wire 4 to the charging station 6, including the passing of the narrow passage 5 and FIG. 8 shows the different method steps for controlling the robotic mower 2.

The method for controlling the robotic mower 2 to a predetermined position, by means of a guide wire 8, starts in step S100, in which the robotic mower 2 detects, by means of the at least one sensor 12, 14, 16, 17, 19, a signal from the guide wire 8. In order not to unnecessary smudge the figures, the sensors are shown as dots, without reference numerals, on the robotic mower 2 in FIGS. 4 to 7.

When the signal from the guide wire 8 has been detected the robotic mower 2 continues to move towards the guide wire 8 until a first predetermined threshold corresponding to a first signal strength is reached. The robotic mower 2 then follows, in step S102, the guide wire 8 at a first distance. The first distance is shown as a dotted line 10 in FIGS. 4 to 7. The first distance corresponds to the given first signal strength, i.e. the first threshold signal strength. Thus, when one or more of the sensors 12, 14, 16, 17, 19 senses that the first signal strength is on or above the first predetermined threshold, the robotic mower 2 will follow the guide wire 8 by controlling the robotic mower 2 such that the first signal strength that is sensed by the sensors 12, 14, 16, 17, 19 is substantially constant. The first predetermined threshold is determined by the control unit 22 each time at least one of the sensors 12, 14, 16, 17, 19 detects the presence of the signal from the guide wire 8. The control unit 22 randomly selects the first predetermined threshold, such that the first signal strength that the robotic mower 2 follows differs from time to time in order to avoid the creation of tracks on the lawn. Since the first signal strength varies from time to time also the first distance to the guide wire 8 will also vary. As is understood by a person skilled in the art, one or more sensors may be used to follow the guide wire 8 at a first distance.

The robotic mower 2 will continue to follow the guide wire 8 at a first distance until, in step S104, a signal from the boundary wire 4 is detected, by means of the at least one sensor 12, 14, 16, 17, 19. The detection of the boundary wire 4 signal means that the robotic mower 2 is approaching a narrow passage 5. If one now continues to control the robotic mower 2, such that it follows the guide wire 8, it might happen that the first distance to the guide wire 4 is such that the robotic mower 2 will be "out of bounds" when passing the narrow passage 5, i.e. is controlled to be outside the delimited area A. Thus, in order to avoid this scenario, the inventor realized that one cannot use the first distance when passing the narrow passage 5. This corresponds to the situation depicted in FIG. 5

When the signal from the boundary wire 4 has been detected the robotic mower 2 continues to move towards the boundary wire 4 until a second predetermined threshold corresponding to a second signal strength is reached. The robotic mower 2 then follows, in step S106, the boundary wire 4 at a second distance. The second distance corresponds to the given second signal strength, i.e. the second threshold signal strength. Thus, when one or more of the sensors 12, 14, 16, 17, 19 senses the second signal strength that is on or above the second predetermined threshold, the robotic mower 2 will follow the boundary wire 8 by controlling the robotic mower 2 such that the second signal strength that is sensed by the sensors 12, 14, 16, 17, 19 is substantially constant. The second predetermined threshold is determined by the control unit 22 each time at least one of the sensors 12, 14, 16, 17, 19 detects the presence of the signal from the boundary wire 8. The control unit 22 randomly selects the second predetermined threshold, such that the second signal strength that the robotic mower 2 follows differs from time to time in order to avoid the creation of tracks on the lawn. Since the second signal strength varies from time to time also the second distance to the boundary wire 8 will also vary.

The robotic mower 2 will follow the boundary wire 4 until detecting, in step S108, that the first signal strength from the guide wire 8 is low, i.e. falls outside the first predetermined threshold, in which case the robotic mower 2 starts following, in step S110, the guide wire 8 again. In a preferred exemplary embodiment, the first predetermined threshold is lower than the second predetermined threshold.

As mentioned above, there are many ways to use the sensors 12, 14, 16, 17 and 19 in order to control the robotic mower 2 to a predetermined position, by means of a guide wire 8 and/or a boundary wire 4 and especially through a narrow passage 5. For example, both front sensors 12, 14 may be used to control the robotic mower 2 in order increase the accuracy when the robotic mower 2 follows the guide wire 8 and/or the boundary wire 4.

Although, the present invention has been described above with reference to specific embodiments, it is not intended to be limited to the specific form set forth herein. Rather, the invention is limited only by the accompanying claims.

In the claims, the term "comprises/comprising" does not exclude the presence of other elements or steps. Furthermore, although individually listed, a plurality of means or elements may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc. do not preclude a plurality. Reference signs in the claims are provided merely as a clarifying example and shall not be construed as limiting the scope of the claims in any way.

The invention claimed is:

1. A method for controlling a robotic mower to a predetermined position, with a guide wire within an area delimited by a boundary wire, said robotic mower comprising a control unit and at least one sensor, the method comprising:
   detecting, using the at least one sensor, a signal from the guide wire,
   following the guide wire at a first distance, wherein the first distance corresponds to a first signal strength that is sensed by the at least one sensor and wherein the control unit randomly selects the first signal strength each time the guide wire signal is detected,
   detecting with the at least one sensor, a signal from the boundary wire,
   following the boundary wire at a second distance, wherein the second distance corresponds to a second signal strength that is sensed by the at least one sensor and wherein the control unit randomly selects the second signal strength each time the boundary wire signal is detected,
   detecting that the first signal strength from the guide wire falls outside a first predetermined threshold signal strength, and
   repeating the step of following the guide wire at a first distance, for enabling the robotic mower to pass through a passage formed by the boundary wire, wherein the guide wire extends through the passage, and wherein the passage is a passage preventing the mower from passing through by only relating to one single wire signal, wherein said one single wire signal is the boundary wire signal.

2. The method according to claim 1, wherein the robotic mower continues to move towards the guide wire, after the signal from the guide wire has been detected, until the first predetermined threshold signal strength corresponding to the first signal strength is reached.

3. The method according to claim 1, wherein the robotic mower follows the guide wire by controlling the robotic mower such that the first signal strength that is sensed by the at least one sensor is substantially constant.

4. The method according to claim 1, wherein the control unit randomly selects the first predetermined threshold signal strength, such that the first signal strength that the robotic mower follows differs from return journey to return journey to a charging station in order to avoid creation of tracks on a lawn.

5. The method according to claim 1, wherein the robotic mower continues to move towards the boundary wire, after the signal from the boundary wire has been detected, until a second predetermined threshold signal strength corresponding to the second signal strength is reached.

6. The method according to claim 5, wherein the control unit randomly selects the second predetermined threshold signal strength, such that the second signal strength that the robotic mower follows differs from return journey to return journey to a charging station in order to avoid creation of tracks on a lawn.

7. The method according to claim 1, wherein the robotic mower follows the boundary wire by controlling the robotic mower such that the first signal strength that is sensed by the at least one sensor is substantially constant.

8. A robotic mower controllable to a predetermined position, with a guide wire within an area delimited by a boundary wire, said robotic mower comprising a control unit and at least one sensor, wherein the control unit comprises a processor and a memory, the memory comprising a non-transitory medium, said memory storing computer program code, the computer program code providing instructions executed by the processer and thereby causing the robotic mower to:
   detect, using the at least one sensor, a signal from the guide wire,
   follow the guide wire at a first distance, wherein the first distance corresponds to a first signal strength that is sensed by the at least one sensor and wherein the control unit randomly selects the first signal strength each time the guide wire signal is detected,
   detect, using the at least one sensor, a signal from the boundary wire,
   follow the boundary wire a first time at a second distance, wherein the second distance corresponds to a second signal strength that is sensed by the at least one sensor and wherein the control unit randomly selects the second signal strength each time the boundary wire signal is detected,
   detect that the first signal strength from the guide wire falls outside a first predetermined threshold signal strength, and
   follow the guide wire a second time for enabling the robotic mower to pass through a passage formed by said boundary wire, wherein the guide wire extends through the passage, and wherein the passage is a passage preventing the mower from passing through by only relating to one single wire signal, wherein said one single wire signal is the boundary wire signal.

9. The robotic mower according to claim 8, wherein the robotic mower moves towards the guide wire, after the signal from the guide wire has been detected, until the first predetermined threshold signal strength corresponding to the first signal strength is reached.

10. The robotic mower according to claim 8, wherein the instructions executed by the processor direct the robotic mower to follow the guide wire by controlling the robotic mower such that the first signal strength that is sensed by the at least one sensor is substantially constant.

11. The robotic mower according to claim 8, wherein the control unit randomly selects the first predetermined threshold signal strength, such that the first signal strength that the robotic mower follows differs from return journey to return journey to a charging station in order to avoid creation of tracks on a lawn.

12. The robotic mower according to claim 8, wherein the instructions executed by the processor direct the robotic mower to continue to move towards the boundary wire, after the signal from the boundary wire has been detected, until a second predetermined threshold signal strength corresponding to the second signal strength is reached.

13. The robotic mower according to claim 12, wherein the control unit randomly selects the second predetermined threshold signal strength, such that the second signal strength that the robotic mower follows differs from return journey to return journey to a charging station in order to avoid creation of tracks on a lawn.

14. The robotic mower according to claim 8, wherein the instructions executed by the processor direct the robotic mower to follow the boundary wire by controlling the robotic mower such that the first signal strength that is sensed by the at least one sensor is substantially constant.

15. A memory in the form of a non-transitory medium, said memory storing computer program code, the computer program code capable of implementing the method according to claim 1.

* * * * *